United States Patent

Sayiner et al.

[11] Patent Number: 6,097,769
[45] Date of Patent: Aug. 1, 2000

[54] VITERBI DETECTOR USING PATH MEMORY CONTROLLED BY BEST STATE INFORMATION

[75] Inventors: Necip Sayiner; Jeffrey Lee Sonntag, both of Allentown, Pa.

[73] Assignee: Lucent Technologies Inc., Murray Hill, N.J.

[21] Appl. No.: 09/021,327

[22] Filed: Feb. 10, 1998

[51] Int. Cl.⁷ .............................. H03D 1/00; H04L 27/06
[52] U.S. Cl. ......................... 375/341; 375/262; 714/795
[58] Field of Search .................................. 375/341, 262, 375/265, 340; 714/794, 795, 796

[56] References Cited

U.S. PATENT DOCUMENTS

| | | | |
|---|---|---|---|
| 5,432,820 | 7/1995 | Sugawara et al. | 375/341 |
| 5,509,021 | 4/1996 | Todoroki | 371/43 |
| 5,588,011 | 12/1996 | Riggle | 371/43 |
| 5,917,794 | 6/1999 | Honma | 369/59 |
| 5,917,862 | 6/1999 | Shimoda | 375/341 |

*Primary Examiner*—Chi H. Pham
*Assistant Examiner*—Jean B. Corrielus

[57] ABSTRACT

A Viterbi detector, illustratively used in a magnetic read channel integrated circuit, provides a "final" output signal as to the most likely state of the input data signal. The Viterbi detector typically utilizes branch metric generation, add-compare-select operations, and a path memory. The best state is found prior to the final decision, and is based on the state having the lowest state metric. The best state information is used to choose an output from the path memory, so that the output data from the end of the path memory line associated with the best state is selected as the final decision of the Viterbi detector. This allows for shortening the length of the path memory in typical applications. At least one control loop may also be controlled by preliminary decisions based on the best state.

2 Claims, 6 Drawing Sheets

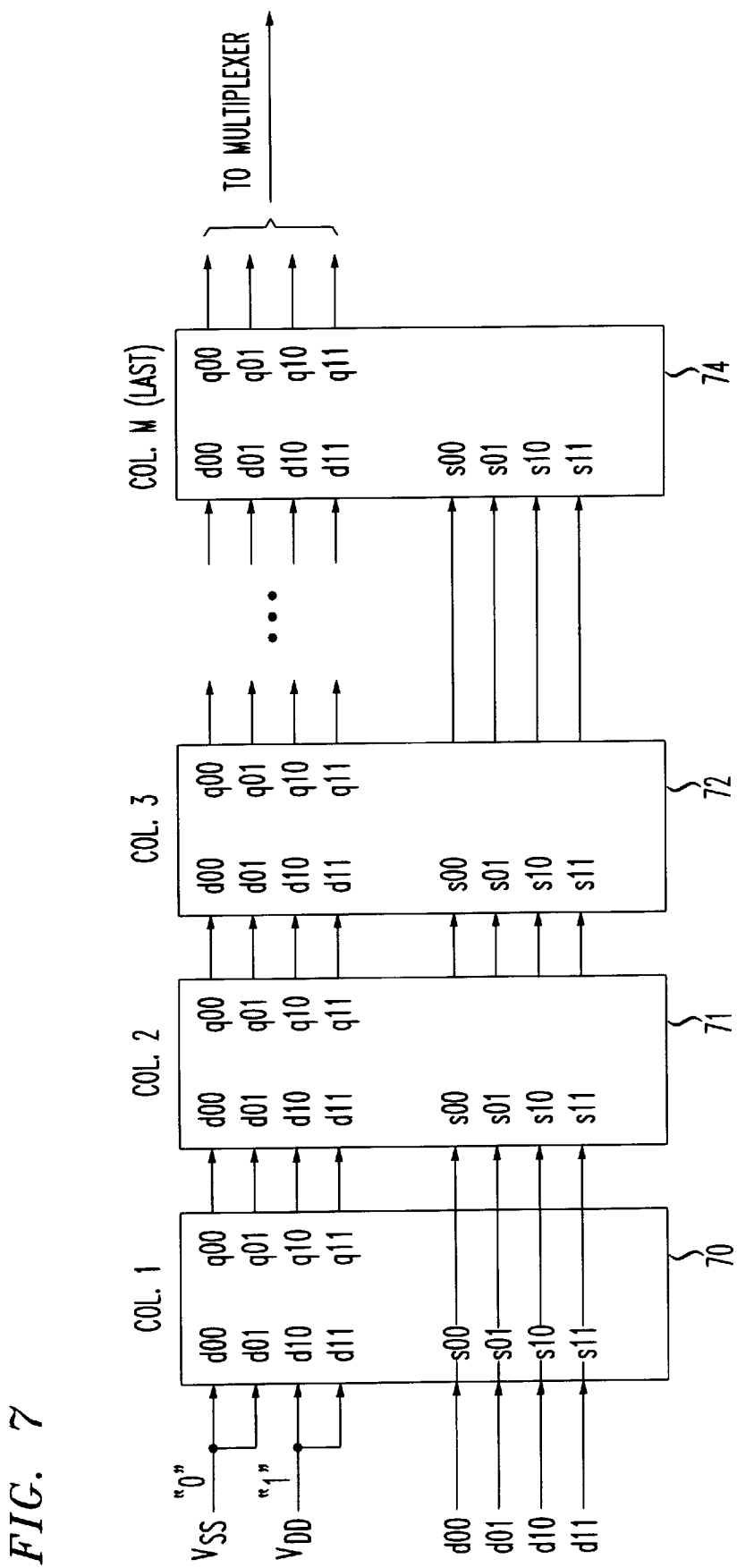

VITERBI DETECTOR USING PATH MEMORY CONTROLLED BY BEST STATE INFORMATION

BACKGROUND OF THE INVENTION

1. Field of the Invention

The present invention relates to a Viterbi detector that uses best state information to control a path memory.

2. Description of the Prior Art

The use of Viterbi detectors has increased with increased sophistication of integrated circuits, allowing for this detection technique to be used in a wide variety of applications. For example, wireless cellular phones and various forms of digital television broadcasting now can economically gain an improvement in signal-to-noise ratio at the detector stage by the use of the Viterbi technique. The Viterbi technique has recently been employed with magnetic disk drives, in order to better recover a desired data signal in the presence of various forms of noise and distortion due to the nature of the magnetic recording media. The Viterbi technique has proven especially valuable when used with magneto-resistive (MR) recording heads used with various partial-response (PR) detection schemes.

A typical magnetic disk-drive implementation using a fourth-order PR detector, referred to as "EPR4", and the associated control loops is shown in FIG. 1. This implementation has two control loops: the first includes a phase-locked loop (PLL) 111 to generate a recovered clock to control the sampling of the data pulses read from the magnetic medium (e.g., rotating disk), and the second includes an integrator to control the gain of a variable gain amplifier (VGA) 101. Referring first to the main signal path, the input signal, illustratively from a magnetic read head 100, is supplied to the VGA (101), the output of which is applied to the continuous time filter 102, which provides a degree of equalization. The output of filter 102 is sampled by sampler 103 and supplied to equalizer 104, which may supply an additional degree of phase equalization if desired, so that combined effects of the original pulse shape and all equalization produce the partial response known as PR4. The equalized signal is then supplied to the analog-to-digital (A/D) converter 105, the output of which is supplied to a 1+D filter 106 via node 114. The 1+D filter 106 serves to convert the PR4 equalized signal to an EPR4 equalized signal, and supplies the filtered signal to the Viterbi detector 107, which selects the most likely value of the signal and supplies a "final" output signal on line 120 to other portions of the disk drive circuitry, typically providing for decoding, error recovery, etc. In the illustrative case, the Viterbi detector provides the EP4 partial response, but other partial response functions may be implemented with Viterbi detectors of appropriate design.

The path to the control loops includes a symbol-by-symbol slicer 108, which selects one of three possible levels (−1, 0 and +1) in the illustrative case of equalization to the PR4 response, which has a three-level eye diagram. The slicer 108 supplies its preliminary decisions to a summer 109. Note that "preliminary" as used herein means that the decision is performed before the final output of the Viterbi detector 107. Therefore, the preliminary decision may be somewhat less accurate, but is obtained more quickly than the final decision. The summer 109 also receives an input representing the signal from node 114 on line 115, in order to form an error signal on line 116, which is supplied both the phase ($\phi$) error detector 110 and the gain error detector 112. The preliminary decision is also supplied to the phase error detector 110 and the gain error detector 112. The output of the phase error detector 110 is supplied to the phase-locked loop 111, which supplies a recovered clock signal on line 118 for control of the sampler 103. The output of the gain error detector 112 is supplied to the integrator 113, which supplies a gain control signal on line 119 to the VGA 101. As thus described, these control loops are conventional in the art.

In some non-disk drive applications with very low loop bandwidths, a control loop could be supplied with the "final decision" from the Viterbi detector. This would improve the accuracy of the control signal, but would delay it in time due to the delay through the Viterbi detector. This delay may lead to a loss in effective control of the desired loop, whether it be for generating a recovered clock or gain control. In order to understand this delay, note that the Viterbi technique makes use of the history of digital data samples, in order to derive the most likely value (e.g., digital "0" or "1") for a given sample. That is, by relying on a history of the samples, an improvement in signal-to-noise ratio of up to several dB is frequently possible, as compared to simply looking at the value of a single sample. This allows for a reduction in data errors, which allows for improved performance.

Maximum Likelihood detection is the optimal detection method for partial-response schemes, where the received signal is equalized into a known PR of the form:

$$a_n D^n + a_{n-1} D^{n-1} + \ldots + a_0 D^0$$

where D is the delay operator. The Viterbi detector, which is a means of performing maximum-likelihood detection, takes the symbol-spaced samples of the equalized signal, and generates the symbol sequence that is most likely, given the sequence of the samples. For a digital implementation of this detector, the equalized samples are digitized using an A/D converter, with a resolution that adds sufficiently low quantization noise. In general, the Viterbi detector has N "states", (where $N \leq 2^n$) where each state represents the last n symbols. There are transitions in the trellis diagram that connect any state to its two possible predecessor states for a binary PR with no coding constraints built into the trellis. In order to decide the most likely sequence of symbols, the Viterbi detector chooses the most likely transition based on minimizing the mean-square-error (MSE) as will be explained below. Therefore, at any given time, there is one path that ends at each state, referred to as the survivor path.

Let us take the PR $a_3 D^3 + a_2 D^2 + a_1 D + a_0$, as an example to illustrate the minimum MSE criterion, where $a_3$, $a_2$, $a_1$ and $a_0$ are the coefficients that determine the partial response. This type of partial response is referred to as "EPR4" when $a_3 = a_2 = -a_1 = -a_0$, but is considered herein in the general fourth-order case. Still other response types are known in the art for various applications, with higher-order responses being likely in future-generation read channel designs. Consider two of 8 possible initial states, being illustratively states 010 and 110, and their transition to state 100: For the transition from state 010 to state 100 (which corresponds to a symbol sequence 0100) the ideal equalized sample would be $(-a_3 + a_2 - a_1 - a_0)$. The error is defined as the squared difference between the received noisy sample and this ideal sample; i.e. $(y_n - (-a_3 + a_2 - a_1 - a_0))^2$. Let's call this the "branch_metric_0". Similarly, for the other possible transition to the state 100 (i.e., from state 110), "branch-metric_1" equals $(y_n - (a_3 + a_2 - a_1 - a_0))^2$. In order to choose the most likely path to state 100, we need to choose the branch (transition) that leads to the minimum "state metric", which is the sum of the state metric of the predecessor state and the associated branch metric. That is, the state metric is the accumulated sum of the branch metrics of that path, and is also referred to herein as "SM". (The state metric is alternatively referred to as the "path metric" by workers in the art). Note that as used herein, the term "best state" refers to the sate with the lowest state metric. Hence, we need to perform the Add-Compare-Select (ACS) operation:

1. Add state metric 010 at time k-1 to branch_metric_0
2. Add state metric 110 at time k-1 to branch_metric_1
3. Compare the two sums.
4. Select the sum with the lower state metric and update state metric of state 100.

In an illustrative prior-art case, an eight-state Viterbi detector includes eight ACS circuits having eight decision outputs that are provided to a path memory. The path memory is used to process the decisions made by all of the states so that each segment of the path memory (associated with a particular state) contains a candidate data sequence, which is correct if that particular state is actually the correct state. The information in the path memory can be thought of as a tree structure. The depth of the path memory (in the prior art) must be sufficient to ensure that when a final decision is made by tracing back starting from an arbitrary terminal (or leaf) of the tree, the same root, resulting in the same final binary decision, is arrived at no matter which leaf is chosen as a starting point. While the required depth of the path memory depends substantially upon the particular partial response and any codes which may have been used, it is typically necessary to have a depth (and additional latency) between 12 and 20 bit long. Therefore, it can be seen that the path memory adds significant delay in reaching the final decision.

While the circuitry of FIG. 1 is suitable for implementing PR4 and EPR4 partial responses, higher-order partial responses that are used with magnetic media will use other circuit implementations. This higher-order partial responses will produce an even larger difference between the preliminary decision obtained by the above technique and the final decision. Therefore, what is needed is a method of producing accurate, low-latency preliminary decisions that can be used for high-order partial response Viterbi detectors.

SUMMARY OF THE INVENTION

We have invented a method and implementation for controlling the output of a path memory using the best state information in a Viterbi detector. The best state information typically provides for shortening the length of the path memory.

BRIEF DESCRIPTION OF THE DRAWING

FIG. 7 shows interconnection of columns in a path memory and the final outputs.

DETAILED DESCRIPTION OF THE INVENTION

The following detailed description relates to a technique and circuitry for controlling the path memory in a Viterbi detector using best state information that produces preliminary decisions prior to the final decision.

Figure 1:
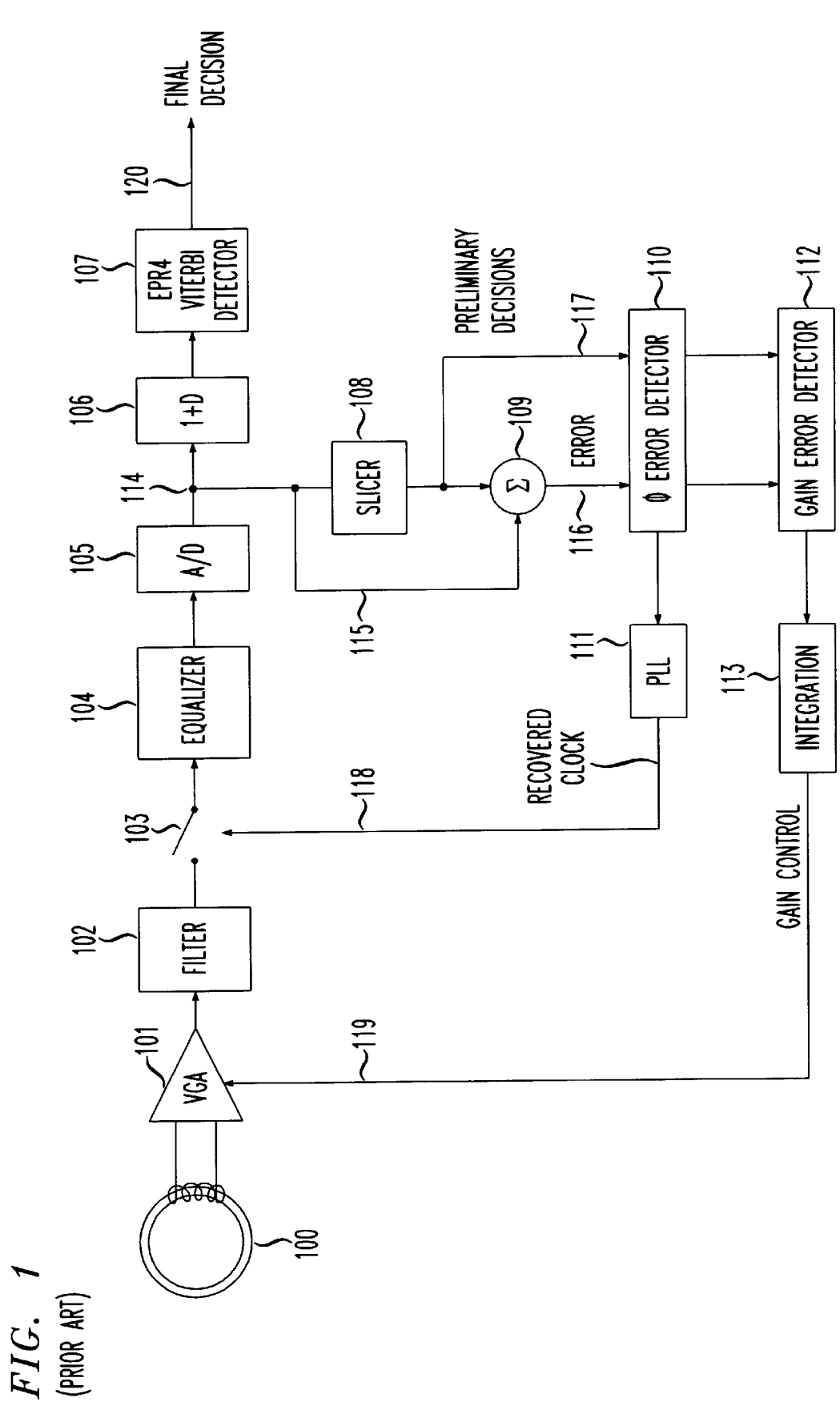
FIG. 1 shows an illustrative prior-art read channel system for use with magnetic disk drives.
Figure 2:
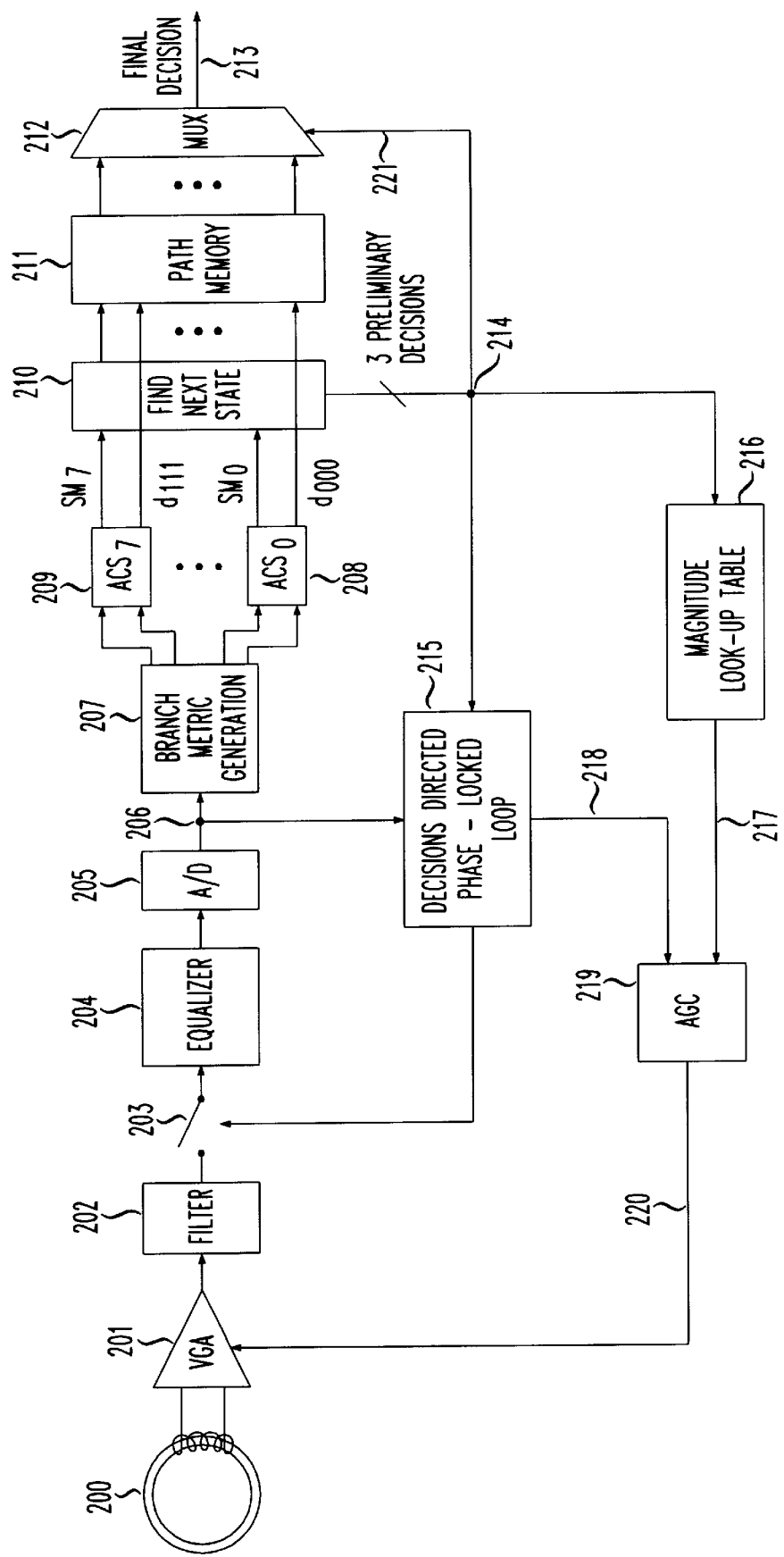
FIG. 2 shows an illustrative read channel system using the present invention.

Referring to FIG. 2, an illustrative magnetic disk drive read channel that implements the invention is shown, including the Viterbi detector and the associated control loops. The magnetic read head 200 supplies a low-level data signal to the VGA 201, which amplifies the signal and supplies it to the continuous time filter 202, after which the signal is sampled by sampler 203 and equalized by equalizer 204. Then, the analog signal is converted to digital form by A/D converter 205, providing a digital output coupled to node 206, which connects to the input of the branch metric generator 207. The branch metric generator 207 produces outputs that represent in binary form the transitions from one state to another. Since there are two possible transitions to each state, the branch metric generator 207 provides two outputs to the each ACS units, being $ACS_0$(208) through $ACS_7$(209). The outputs of the ACS units are supplied to the best state detector 210, and also to the path memory 211, from which the best state is selected by multiplexer 212, thereby providing the final decision on output line 213. Note that $SM_0$ represents the state metric of state "0", which is represented in binary as "000" for the eight-state case used illustratively herein, and so forth. The data outputs of the ACS units are therefore represents as $d_{000}$ to $d_{111}$ herein, and are supplied as inputs to the path memory 211.

The Viterbi detector may be of conventional prior-art design insofar as blocks 207, 208, and 209 are concerned. However, the preliminary best state detector 210 is new with the present invention, and provides a preliminary decision output to the control loops via node 214. In the illustrative case, the preliminary decision is used to control two loops, as follows: The node 214 is connected to the inputs of the decision directed digital PLL 215 and the magnitude lookup circuit 216. In the first control loop, the decision-directed digital PLL 215 provides a control signal on line 221 to the sampler 203, and may be of a design known in the art; see, for example, J. W. M. Bergmans, "Efficiency of Data-Aided Timing Recovery Techniques", *IEEE Transactions on Information Theory*, Vol. 41, No. 5, pp. 1397 to 1408, September 1995; see especially FIG. 9. In addition, the path memory 211 may be similar to prior-art designs, except that in an preferred embodiment it is provided with multiple outputs (one for each path) that are selected by multiplexer 212 that is also controlled by the preliminary decision, as described further below.

In the second control loop, the magnitude lookup circuitry 216 provides a magnitude signal on line 217 to the AGC block 219, with the magnitude signals having values of -1, 0 or +1 in the illustrative case of a tri-level code. The decision-directed PLL provides to the AGC on line 218 an error signal that represents the difference between the output value from the A/D converter 205 and the ideal value for a given partial response. The AGC provides a control voltage on line 320 to the VGA 201. However, still other types of control loops may advantageously be used with the preliminary decision signal.

Figure 3:
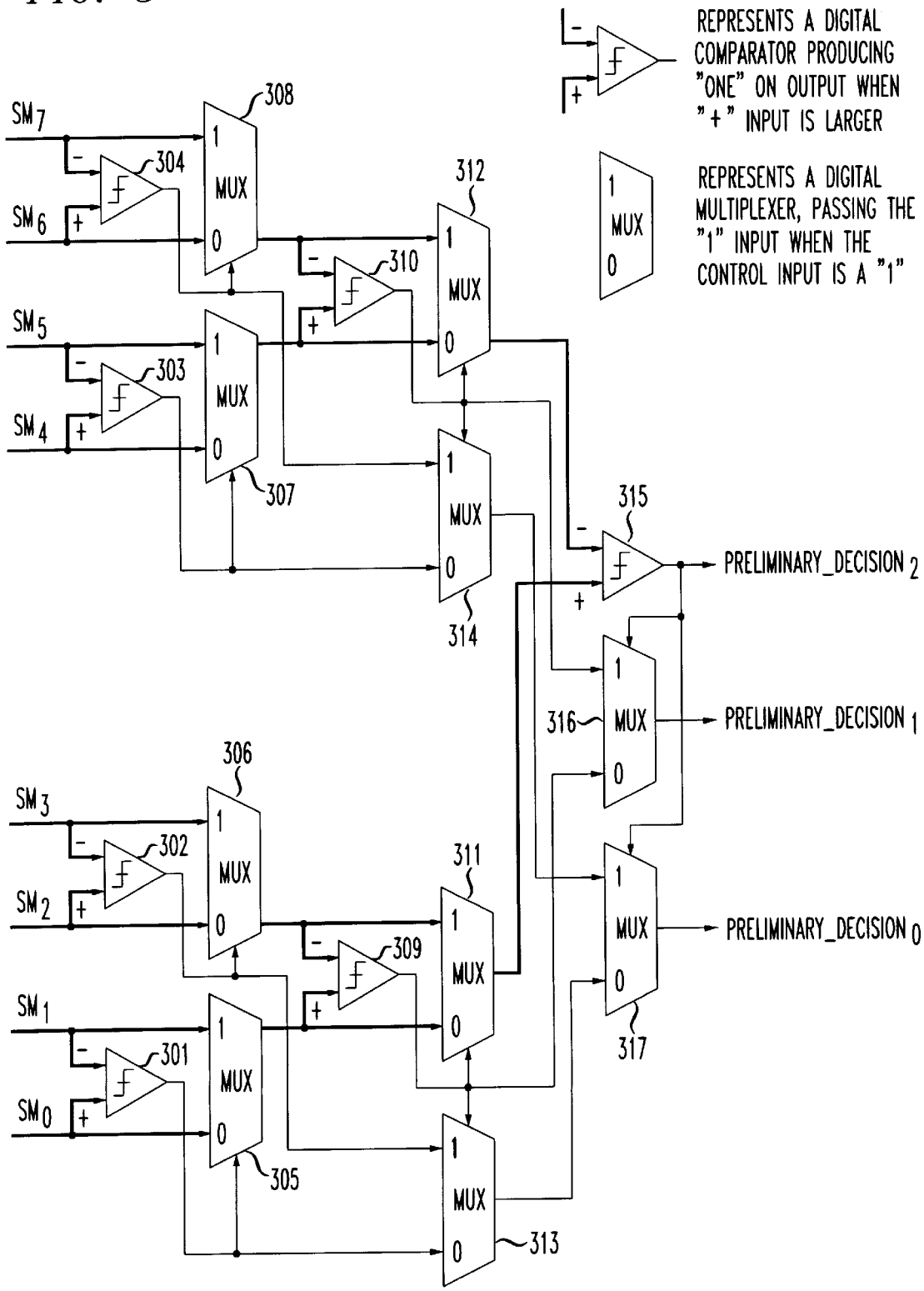
FIG. 3 shows a first embodiment of preliminary decision circuitry.

In order to generate the preliminary decision signal, circuitry is provided that determines the best state prior to the final decision from the Viterbi detector; i.e., 10 prior to the output of the path memory 211. One type of circuitry for implementing the preliminary best state block 210 is shown in FIG. 3 for the illustrative case of 8 states, which is represented by the three bit number: (preliminary_decision$_2$, preliminary_decision$_1$, preliminary_decision$_0$), where preliminary_decision$_0$ is the lease significant bit (LSB). The digital comparators 301 to 304 receive the state metric signals SM$_0$ to is SM$_7$ from the ACS blocks (ACS$_0$ to ACS$_7$) shown in FIG. 2. The outputs of the these digital comparators control which of the state metric signals is selected by the multiplexer 305 to 308. Note that the state metric signal having the lowest value is selected by a given multiplexer, since each digital comparator produces a "one" output when the "+" input is larger than the "−" input, and each digital multiplexer passes the "1" input when the control input is a "1". Therefore, the smallest of each pair of state metrics is supplied to the digital comparators 309 and 310, so that multiplexers 311 and 312 again choose the lowest value of the surviving pair and supply it to the digital comparator 315.

The digital comparator 315 selects the lowest surviving value and provides an output representing preliminary_decision$_2$, being the most significant bit of the preliminary best state. The digital comparator 316 selects the next higher surviving value and provides an output representing preliminary_decision$_1$, being the next-most significant bit of the preliminary best state. The digital comparator 317 selects the highest surviving value from the multiplexers 313 and 314 and provides an output representing preliminary_decision$_0$, being the least significant bit of the preliminary best state. Therefore, the result of the find best state operation is to encode, typically in a binary format, the subscript associated with the state metric (SM) input which is the smallest of all of the SM inputs. If, as is typical, the N-bit wide state metrics were calculated using modulo $2^N$ arithmetic, the comparators should also work in modulo $2^N$ arithmetic (for example, with N=8, modulo 256 arithmetic, recognizing that 0 is one more than 255). The initial pairings (in this example, 7 & 6, 5 & 4, . . . ) and all subsequent groupings may be rearranged arbitrarily, requiring only some encoding of the final results to obtain any desired format (e.g. binary) to represent the index of the state with the minimum state metric.

Figure 4:
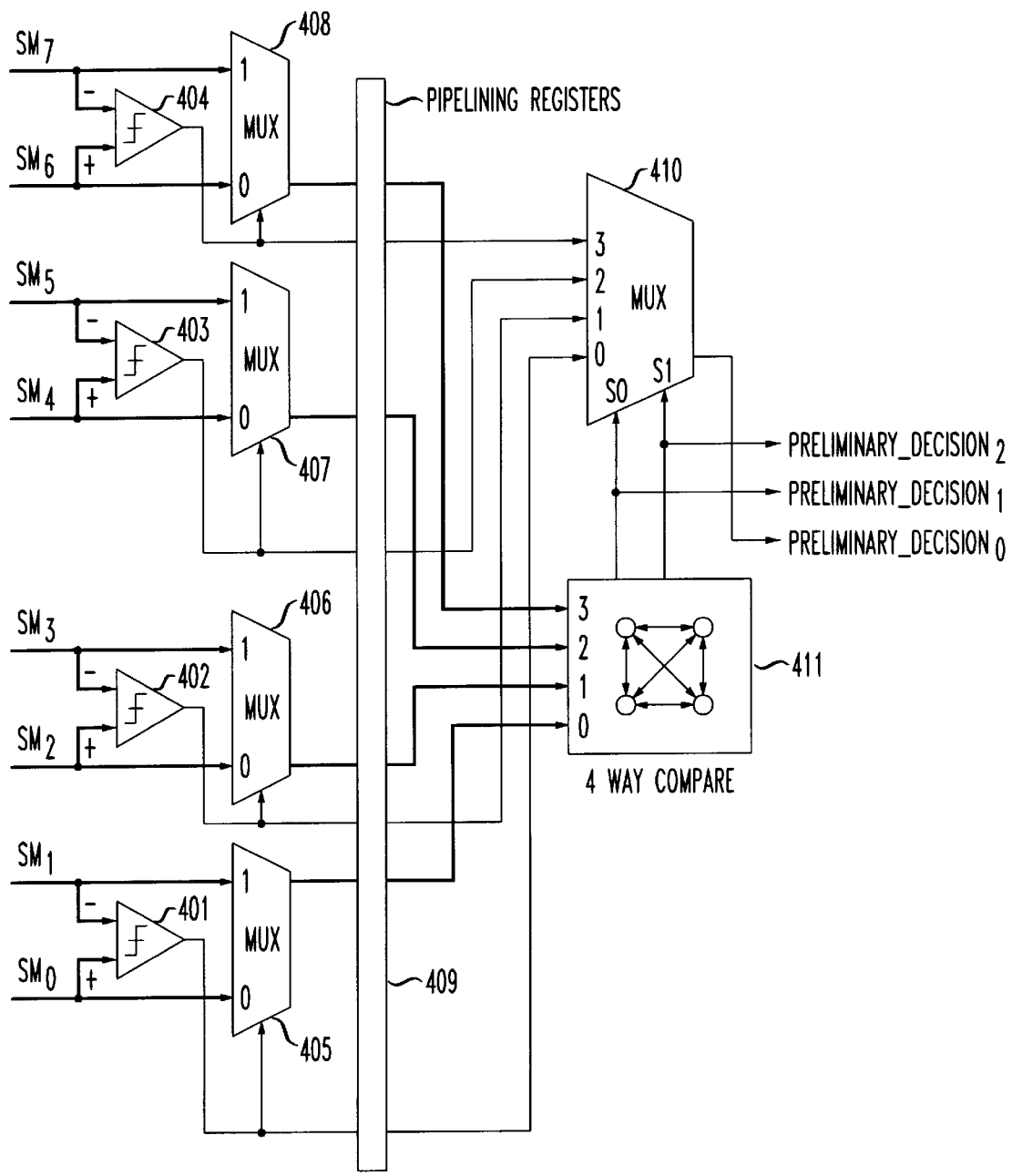
FIG. 4 shows a second embodiment of preliminary decision circuitry

As shown in FIG. 3, three series comparisons and two series multiplexing operations need to be compressed into a single clock cycle. However, in high speed applications, pipelining may be inserted into the tree of comparators, with the penalty of additional latency. If latency is to be minimized in a high speed application, the final two layers of decisions may be compressed into a single four-way (six comparator) comparison, where the six comparator outputs are encoded into a two-bit result indicating which input was the smallest. Of course, this comes at some increased implementation cost. A high speed, low latency implementation is shown in FIG. 4, wherein the digital comparators 401 to 404 each select the lowest value of the associated pair of inputs, and supplies that lowest value to the pipelining registers 409. The corresponding output of the pipelining registers is supplied to the multiplexer 410. The inputs (SM$_0$ . . . SM$_7$) are also supplied to the multiplexers 405 to 408, which selects the "1" input when the control input supplied by the associated digital comparator is a "1". The multiplexer outputs are supplied via the pipelining registers 409 to the four-way comparator 411, which provides both the preliminary_decision$_2$ and preliminary_decision$_1$ signals. In addition, these signals are provides to the S0 and S1 control inputs of the multiplexer 410, in order to select the preliminary_decision$_0$.

When the partial response used is higher order than the one used here for illustration purposes (EPR4), the series of comparisons prior to the final four-way comparison may take one clock cycle per stage. This adds to the latency of obtaining the best state, and hence delays the preliminary decisions. It is desirable to have minimal latency in obtaining such preliminary decisions. This can be achieved by using (in these first stages) comparators that have lesser resolution than the resolution of the final stage, for example. This requires that the state metrics are paired up in a certain way, rather than arbitrarily, if no degradation in the quality (or reliability) of the preliminary decisions is required. For example, for a 16-state detector, the first stage of comparators that reduce the competing states from 16 to 8, can use 3-bit or 4-bit comparators (for the same modulo 256 arithmetic mentioned above). In the second stage, where the number of competing states are reduced to 4 from 8, 5-bit comparators can be used, resulting in insignificant, if any, loss in performance. The advantage is that, these two stages of comparison can be compressed into a single clock cycle, reducing the overall latency by one clock cycle. Still other designs for circuitry that provides the preliminary decisions are possible in practicing the present invention.

The length of the path memory may be reduced by using the best state information. That is, without the best state information, one has to choose the path memory output from an arbitrary state, making the path memory long enough to ensure that all states have merged and are carrying the same information. With the best state information, simulations have shown that the path memory may be made about 30% shorter if the final output data is derived from the end of the path memory line associated with the best state. Even when the paths haven't merged, the best state is unlikely to be wrong. This choice of path in the path memory may be made by the multiplexer 212 in FIG. 2, as controlled by the preliminary decision on line 221.

Figure 5:
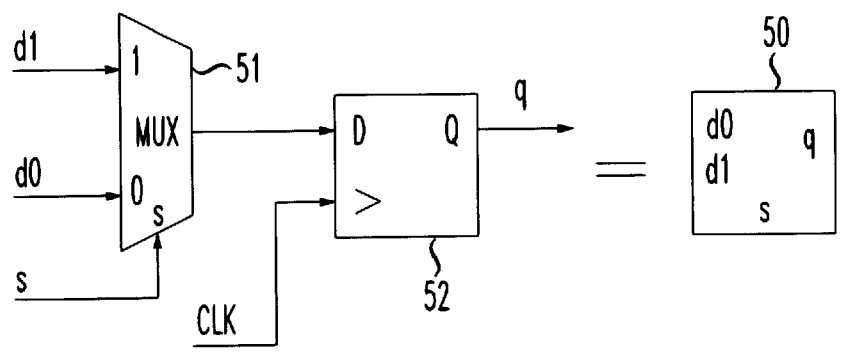
FIG. 5 shows a basic add-compare-select unit as used in the prior-art.
Figure 6:
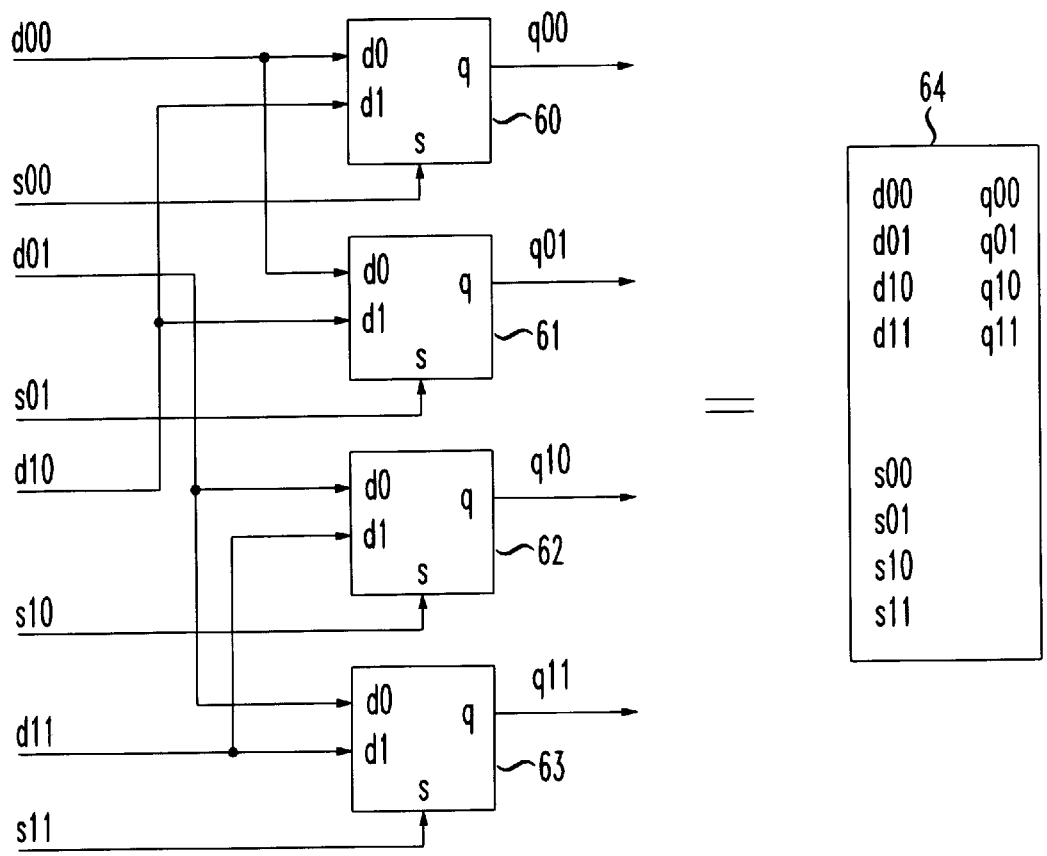
FIG. 6 shows a prior-art path memory column.

The construction of a typical path memory is illustrated in FIGS. 5, 6 and 7 for an illustrative four state trellis (in lieu of the eight state trellis of FIG. 2 for simplicity). FIG. 5 shows the definition of the path memory fabric basic unit 50, comprising a multiplexer 51 and a flip-flop 52. FIG. 6 shows four of the basic units (60, 61, 62 and 63) forming a column (64). FIG. 7 shows a plurality of M columns (70, 71, 72 and 74) that have a plurality of outputs (q00, q01, q10, q11), one of which is selected by a multiplexer as shown in FIG. 2.

While the above illustrative embodiment had been given in terms of an eight-state Viterbi detector, the inventive technique may be applied to a Viterbi detector with any number of states. Also, the above embodiment has been described in terms of a magnetic read channel, typically implemented on an integrated circuit, but other uses and implementations of the invention are possible. For example, a wide variety of telecommunications applications, including cellular phones and digital video, utilize Viterbi decoding techniques. Also, while the Viterbi detector implementation shown above is illustrative of the art, others are possible for use with the present invention.

What is claimed:

1. An integrated circuit comprising a Viterbi detector providing a final decision as to the value of a data signal, with said Viterbi detector including a path memory, characterized in that said path memory has multiple outputs that are coupled to a multiplexer, said multiplexer selecting one of said multiple outputs to provide said final decision, with said multiplexer controlled by a preliminary decision derived from a best state of said data signal that is determined before said final decision, wherein said Viterbi detector comprises a branch metric generator and a multiplicity of add-compare-select units responsive to said branch metric generator, with each of said add-compare-select units providing a state metric to a preliminary best state detector that determines said preliminary decision, and wherein said preliminary best state detector comprises a first decision layer having a multiplicity of digital comparators and multiplexers each receiving a pair of state metrics from said add-compare-select units, wherein each multiplexer selects the lower state metric of a given pair, said preliminary best state detector further comprising a second decision layer having at least one four-way digital comparator receiving four output signals from the multiplexers in said first decision layer and an associated multiplexer receiving four input signals from the outputs of the digital comparators in said first decision layer, wherein said multiplexer in said second decision layer selects the lowest state metric of the four input signals as said preliminary decision.

2. A method of operating a device having a Viterbi detector that provides a final decision as to the value of a data signal, with said Viterbi detector including a path memory, characterized by selecting which path of said path memory provides said final decision by determining a best state of said data signal, wherein said Viterbi detector comprises a branch metric generator and a multiplicity of add-compare-select units responsive to said branch metric generator, with each add-compare-select unit providing a state metric to a preliminary best state detector that determines a preliminary decision, and wherein said preliminary best state detector comprises a first decision layer having a multiplicity of digital comparators and multiplexers each receiving a pair of state metrics from said add-compare-select units, wherein each multiplexer selects the lower state metric of a given pair, and wherein the best state detector comprises a second decision layer having at least one four-way digital comparator receiving four output signals from the multiplexers in said first decision layer and an associated multiplexer receiving four input signals from the outputs of the digital comparators in said first decision layer, wherein said multiplexer in said second decision layer selects the lowest state metric of the four input signals as said preliminary decision.

* * * * *